(12) United States Patent
Fisher

(10) Patent No.: US 7,231,197 B1
(45) Date of Patent: Jun. 12, 2007

(54) ANGLE RATE INTERFEROMETER AND PASSIVE RANGER

(76) Inventor: Daniel E. Fisher, 2708 Shanandale Dr., Silver Spring, MD (US) 20904

(*) Notice: Subject to any disclaimer, the term of this patent is extended or adjusted under 35 U.S.C. 154(b) by 1123 days.

(21) Appl. No.: 09/696,956

(22) Filed: Oct. 27, 2000

(51) Int. Cl.
H04B 1/26 (2006.01)

(52) U.S. Cl. .................. 455/323; 455/207; 455/214; 455/314; 455/334; 342/357.08; 342/417

(58) Field of Classification Search ............ 455/207, 455/456, 137, 164.2, 132, 562.1, 205, 183.1, 455/182.2, 277.1, 192.2, 182.1, 180.3, 456.1, 455/265, 209, 256, 190.1, 272.1, 276.1, 139, 455/273, 216, 214, 456.5, 286, 456.6, 550.1, 455/575.1, 561, 334, 313, 314, 323; 342/112, 342/113, 44, 104, 424, 378, 179, 194, 100, 342/353, 458, 461–465, 450, 445, 442, 107, 342/418, 420, 444, 449, 101, 437, 82, 83, 342/84, 110, 147, 146, 156.9, 357.08, 417, 342/428; 343/461, 463–465, 418, 100 ST, 343/450, 445, 424, 394, 402, 405, 113 R; 375/97, 75
See application file for complete search history.

(56) References Cited

U.S. PATENT DOCUMENTS

| 3,090,957 | A |   | 5/1963  | Albanese et al. |       |
|-----------|---|---|---------|-----------------|-------|
| 3,392,390 | A |   | 7/1968  | Schelisch       |       |
| 3,680,124 | A | * | 7/1972  | Stone et al. ............... | 342/424 |
| 3,697,997 | A | * | 10/1972 | Cooper .................. | 343/108 R |
| 3,789,410 | A | * | 1/1974  | Smith et al. ............ | 343/112 D |
| 3,816,834 | A | * | 6/1974  | Wilson ........................ | 342/424 |
| 4,245,220 | A | * | 1/1981  | Johnson ...................... | 342/147 |
| 4,509,052 | A | * | 4/1985  | Cash .......................... | 342/418 |
| 4,704,613 | A |   | 11/1987 | Albanese et al. |       |
| 4,717,916 | A | * | 1/1988  | Adams et al. .............. | 342/107 |
| 4,845,502 | A |   | 7/1989  | Carr et al.      |       |
| 4,876,549 | A | * | 10/1989 | Masheff ....................... | 342/417 |
| 4,893,316 | A | * | 1/1990  | Janc et al. .................. | 708/300 |
| 4,903,030 | A | * | 2/1990  | Maitre ........................ | 342/113 |
| 4,942,404 | A |   | 7/1990  | Kefer            |       |
| 5,107,522 | A | * | 4/1992  | Kitayama et al. ........... | 375/344 |
| 5,255,000 | A | * | 10/1993 | Puzzo ......................... | 342/442 |
| 5,355,767 | A | * | 10/1994 | Morita ....................... | 89/41.07 |
| 5,416,446 | A | * | 5/1995  | Holler et al. ................. | 331/57 |

(Continued)

FOREIGN PATENT DOCUMENTS

EP          01 30 9018          4/2002

*Primary Examiner*—Edward F. Urban
*Assistant Examiner*—Charles Chow

(57) ABSTRACT

A receiver includes a processor and an RF bridge. The RF bridge is coupled to the processor to receive a reference signal from the processor. The RF bridge includes first and second frequency converters coupled to respective first and second antennas. The RF bridge also includes a third frequency converter coupled to outputs of the first and second frequency converters. In an alternative receiver the processor is coupled to receive an information signal from the RF bridge. The processor includes a digital frequency source to generate the reference signal based on a signal from a clock source and circuitry to detect a frequency difference from the information signal based on the signal from the clock source. In a variant, the circuitry to detect includes a first Fourier transformer having a first center frequency and a second Fourier transformer having a second center frequency different than the first center frequency.

27 Claims, 9 Drawing Sheets

U.S. PATENT DOCUMENTS 5,541,608 A * 7/1996 Murphy et al. .............. 342/442
5,570,099 A * 10/1996 DesJardins .................. 342/378
5,594,452 A * 1/1997 Webber et al. .............. 342/353
6,140,960 A * 10/2000 Kitayoshi ................... 342/360
6,147,640 A * 11/2000 Wachs ........................ 342/354
6,268,829 B1 * 7/2001 Weckstrom ................. 342/418

* cited by examiner

US 7,231,197 B1

ANGLE RATE INTERFEROMETER AND PASSIVE RANGER

BACKGROUND OF THE INVENTION

1. Field of the Invention

The present invention relates to an RF angle rate interferometer.

2. Description of Related Art

U.S. Pat. No. 3,090,957 to Albanese et al. describes an aircraft guiding system for landing aircraft at airports that uses a phase rate interferometer homing system based upon signals received by two spaced apart antennas on an aircraft. U.S. Pat. No. 3,789,410 to Smith et al. describes a passive ranging technique based upon a rate of change of a phase difference between two signals received by widely separated pairs of antennas on an aircraft. U.S. Pat. No. 4,704,613 to Albanese et al. describes a phase-rate interferometer passive ranging system based upon signals received at two spaced apart antennas on an aircraft. All of these known systems rely on a significantly long observation interval.

When attempting to range on an emitting radar, the radar is seldom emitting a steady beacon for a significantly long observation interval. In fact, often such emitting radars are emitting for only a short time duration to avoid detection or other reasons. The short time duration is in the order of a hundred milliseconds or so. As will be discussed herein, the frequency difference observed by two spaced apart antennas at desired ranges is often in the order of only a few Hertz in the desired ranges (about 20 kilometers). To achieve desired range accuracies (about 20% of range), it is necessary to not only measure the frequency difference, but also to measure the frequency difference very accurately. An improved approach is needed to achieve accurate enough measurements of phase rate in just a hundred milliseconds or less.

SUMMARY OF THE INVENTION

It is an object of the present invention to measure the angle rate of the line of sight to an emitter. It is a further object to measure the range to an emitter with good range accuracy in a short time interval.

These and other objects are achieved in a receiver that includes a processor and an RF bridge coupled to the processor to receive a reference signal from the processor. The RF bridge includes first and second frequency converters coupled to respective first and second antennas, and a third frequency converter coupled to outputs of the first and second frequency converters.

In an alternative embodiment, these and other objects are achieved in a receiver that includes a processor and an RF bridge coupled to the processor to receive a reference signal from the processor. The RF bridge includes first and second frequency converters coupled to respective first and second antennas, a frequency source coupled to the first frequency converter, and a third frequency converter coupled to the reference signal and coupled between the frequency source and the second frequency converter.

In an alternative embodiment, these and other objects are achieved in a receiver that includes an RF bridge and a processor coupled to the RF bridge to receive an information signal from the RF bridge. The processor includes a digital frequency source to generate a reference signal based on a signal from a clock source where the reference signal being coupled to the RF bridge, and circuitry to detect a frequency difference from the information signal based on the signal from the clock source.

In an alternative embodiment, these and other objects are achieved in a method that includes steps of capturing a frequency difference that is present at first and second antennas, producing an information signal onto which the frequency difference has been modulated, and analyzing the information signal to determine the frequency difference.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
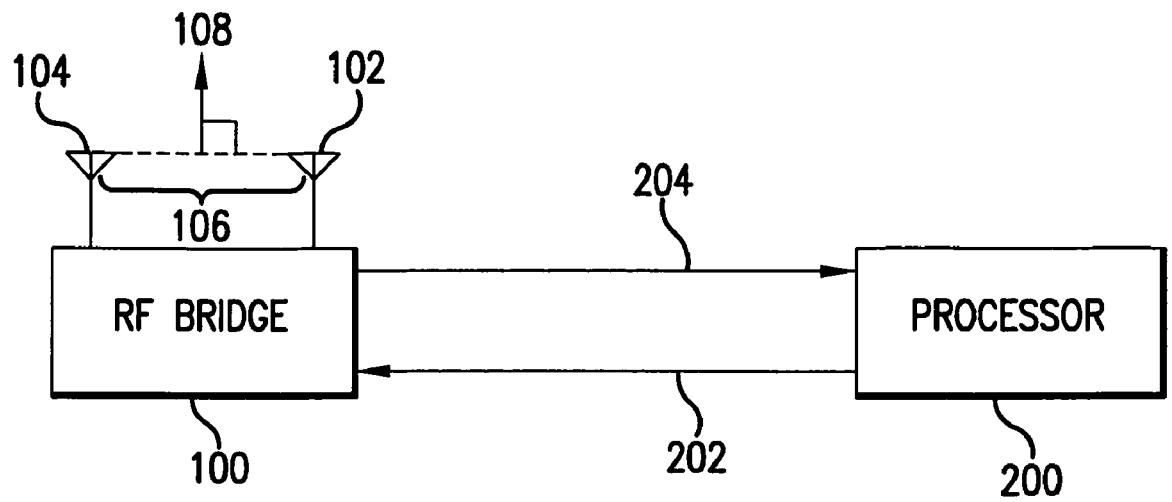
FIG. 1 is a block diagram of a first embodiment of the present invention.

In FIG. 1, an RF angle rate interferometer is constituted by a receiver that includes RF bridge 100 coupled to processor 200. RF bridge 100 receives two signals at respective antennas 102 and 104. Antennas 102 and 104 are spaced apart at opposite ends of baseline 106 of length d. Each antenna preferably, but not necessarily, has a broad beam pattern (e.g., 10 or more degrees), and each beam pattern is oriented to be generally directed toward direction 108 defined perpendicular to baseline 106.

RF bridge 100 receives, at both antennas, an emitter signal from a single emitter that is a distance away from the antennas. When the baseline is rotating with respect to a line of sight to the emitter, the signals received at the antennas have different frequencies. A frequency difference between frequencies of the signals received at antennas 102 and 104 is proportional to an angle rate of rotation of direction 108 with respect to the line of sight to the emitter.

Processor 200 provides processor reference signal 202. Processor reference signal 202 is an 8 MHz signal in the example discussed herein, but may be of a greater or lesser frequency. RF bridge 100 produces an information signal that has the frequency difference between the frequencies of signals received at antennas 102 and 104 frequency modulated onto processor reference signal 202. In FIG. 1, processor 200 receives the information signal as processor input signal 204. Processor 200 then computes this frequency difference and the corresponding angle rate of rotation.

Figure 2:
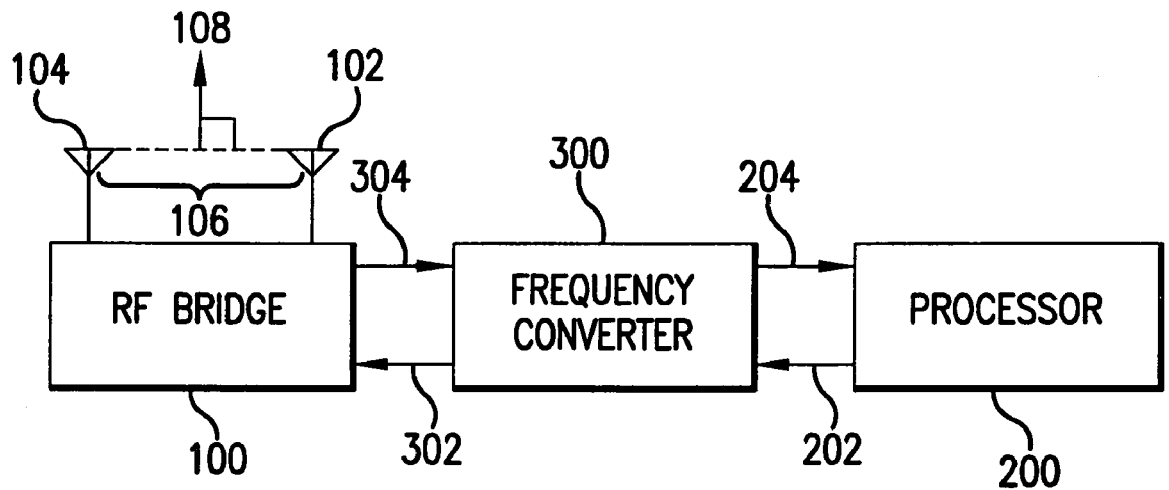
FIG. 2 is a block diagram of a second embodiment of the present invention.

In FIG. 2, an RF angle rate interferometer is constituted by a receiver that includes RF bridge 100 coupled through frequency converter 300 to processor 200. Frequency converter 300 up converts (heterodynes up) processor reference signal 202 by a predetermined intermediate frequency step to form intermediate reference signal 302. In the example discussed herein the frequency step is 792 MHz so that intermediate reference signal 302 has a frequency of 800 MHz. In FIG. 2, RF bridge 100 produces an information signal that has the frequency difference between the frequencies of signals received at antennas 102 and 104 frequency modulated onto intermediate reference signal 302. Frequency converter 300 also down converts (heterodynes down) the information signal (intermediate input signal 304) produced by RF bridge 100 by the predetermined intermediate frequency step (in the example discussed herein, 792 MHz) to form a down converted information signal that is used as processor input signal 204. In the example discussed herein, the down converted information signal that is used as processor input signal 204 is a signal having a frequency of 8 MHz plus any measured frequency difference between signals received at antennas 102 and 104. Processor 200 then computes this frequency difference and the corresponding angle rate of rotation.

The choice between the receiver of FIG. 1 and the receiver of FIG. 2 is at least in part governed (1) by available filter technology for filter 130 that is included in RF bridge 100 (see FIG. 3) at the required frequencies, and (2) by the ratio of the frequency of processor reference signal 202 to the frequency range of the emitter signal: either a range over a band or instantaneous range. This trade-off will be explained in greater detail after the internal circuitry of RF bridge 100 is described.

Figure 3:
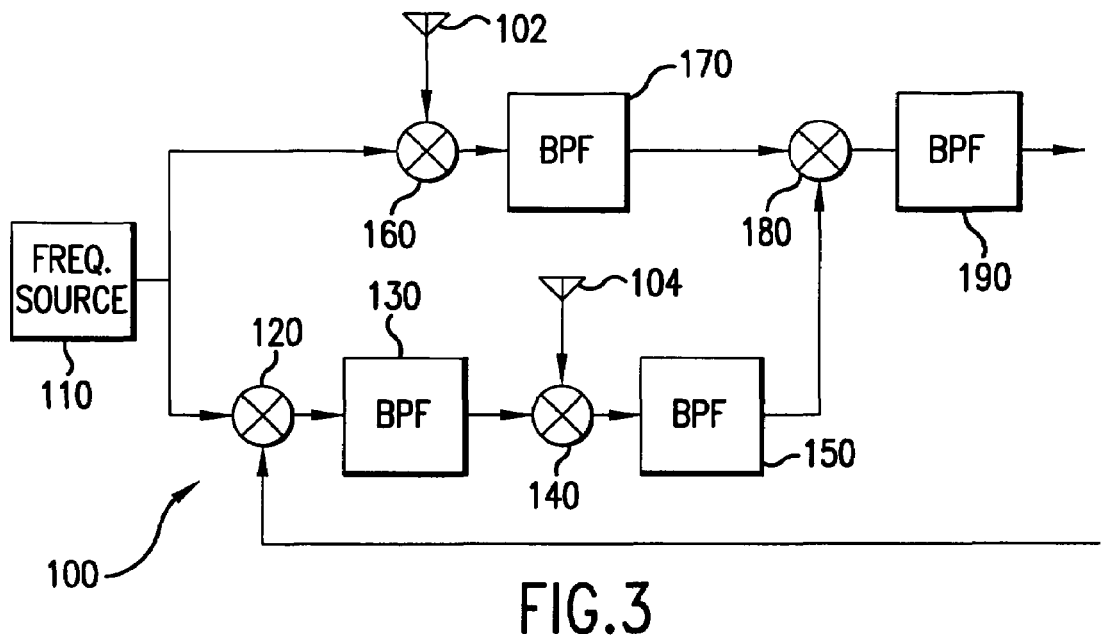
FIG. 3 is a block diagram of an RF bridge of the present invention.

In FIG. 3, RF bridge 100 includes frequency source 110, mixers 120, 140, 160 and 180 and filters (preferably bandpass filters) 130, 150, 170 and 190. Frequency source 110 is a single frequency source providing a mixer pump signal that is either fixed at a predetermined frequency or tunable over a narrow band or a wide band of frequencies to a frequency that is fixed during the measurement interval.

Mixer 120 is preferably a single sideband (SSB) mixer that produces the upper sideband mixer result. To the extent present in the output of mixer 120, any part of the lower sideband signal, the pump signal or any other signal outside of the desired upper sideband is removed by filter 130. Mixer 120 and filter 130 produce a frequency shifted pump signal that is a replica of the pump signal from frequency source 110 replicated at an up converted frequency. The frequency shifted pump signal has a frequency higher than the frequency of the signal from frequency source 110 by the frequency of either processor reference signal 202 (FIG. 1) or intermediate reference signal 302 (FIG. 2).

Preferably, mixers 140 and 160 are single sideband (SSB) mixers that both produce the upper sideband mixer results. To the extent present in the outputs of mixers 140 and 160, any lower sideband signals, pump signals or other signals outside of the desired upper sideband are removed by filters 150 and 170, respectively.

Mixer 160 and filter 170 produce a signal that is a frequency shifted replica of the emitter signal received at antenna 102. The frequency shifted replica has a frequency that is higher than a frequency of the emitter signal received at antenna 102 by the frequency of the pump signal from frequency source 110.

Mixer 140 and filter 150 produce a signal that is a frequency shifted replica of the emitter signal received at antenna 104. The frequency shifted replica has a frequency that is higher than a frequency of the emitter signal received at antenna 104 by the frequency of the frequency shifted pump signal from mixer 120 and filter 130.

The signals from filters 150 and 170 are then combined in mixer 180. Mixer 180 is preferably a single sideband (SSB) mixer that produces the lower sideband mixer result. To the extent present in the output of mixer 180, any upper sideband signal or any other signal outside of the desired lower sideband is removed by filter 190 to provide the information signal from RF bridge 100.

In a representative example of the receiver of FIG. 1 (the narrow band model), the emitter signal is a signal at 54 Mhz, +/−2 MHz (approximately TV channel 2). The "instantaneous" frequency difference between the signal received at antenna 102 and the signal received at antenna 104 is a mere 1 Hertz. Frequency source 110 produces a single frequency signal at 72 MHz, and processor reference signal 202 is an 8 MHz signal. The output of filter 130 is a signal at an 80 MHz frequency. The outputs of filters 150 and 170 are signals centered at frequencies of 134 MHz and 126 MHz, respectively, with a bandwidth of about +/−2 MHz. The outputs of filters 150 and 170 are mixed in mixer 180 and filtered in filter 190. The output of filter 190 is the information signal applied as processor input signal 204, the information signal having a frequency equal to the sum of the approximately 1 Hertz frequency difference and 8 MHz from processor reference signal 202.

Signals from frequency source 110 and processor reference signal 202 are preferably spectrally pure. Typically, the frequency of processor reference signal 202 is based on a direct digital synthesizer, a frequency multiplied replica of a crystal oscillator, or a phase locked loop synthesizer. Filter 130 can be any narrow band filter (high Q filter) that operates in the frequency range (in this example, 80 MHz). For example, in a filter designed to pass a bandwidth of only 100 kHz, a Q of 800 would be required. Such filters include surface acoustic wave devices (SAW devices) and some ceramic resonators, but there are many alternatives.

Similarly, filters 150 and 170 are constructed from any narrow band filter (high Q filter) that operates in the desired frequency range (in this example, 134 and 126 MHz). Filters 150 and 170 are preferably designed to pass a bandwidth of 4 MHz (e.g., the +/−2 MHz frequency range of the emitter signal), and such filters may be implemented with surface acoustic wave devices (SAW devices) and some ceramic resonators, but there are many alternatives.

Filter 190 can be of an extremely high Q design since the signal bandwidth at the output of filter 190 is only a few Hz: +/−1 Hertz in this example. A Q of over 2 million could be used where such filters and resonators are available and can be trimmed accurately to the frequency of processor reference signal 202 (about 8 MHz). Generally, a quartz crystal based filter will perform well in filter 190, but there are many alternatives.

Alternatively, in a representative example of the receiver of FIG. 2 (the wide band model), the emitter signal is a signal existing at a frequency anywhere from 3,000 MHz down to 2,520 MHz (a 480 MHz frequency range). In this example, the signal has a bandwidth of only +/−1 MHz (a bandwidth of 2 MHz), and the instantaneous frequency difference between the signals received at antenna 102 and at antenna 104 is still a mere 1 Hz. Frequency source 110 produces a signal (the pump signal) that can be tuned in frequency steps of 2 MHz starting at 3,825 MHz and stepping to 4,295 MHz (239 stepped frequencies). Processor reference signal 202 is an 8 MHz signal, and intermediate reference signal 302 is an 800 MHz signal. The output of filter 130 is a signal that is tuned in frequency steps of 2 MHz starting at 4,625 MHz and stepping to 5,095 MHz (239 stepped frequencies). Filters 150 and 170 are signals centered at frequencies of 7,620 MHz and 6,820 MHz, respectively, with a bandwidth of about +/−1 MHz. The outputs of filters 150 and 170 are mixed in mixer 180 and filtered in filter 190. The output of filter 190 is a signal having a frequency equal to the sum of the 1 Hertz frequency difference and 800 MHz from intermediate reference signal 302.

The signal from processor reference signal 202 and intermediate reference signal 302 are preferably spectrally pure. Typically, the frequencies of processor reference signal 202 and frequency source 310 (see FIG. 5) and indirectly intermediate reference signal 302 are based on a direct digital synthesizer, a frequency multiplied replica of a crystal oscillator, or a phase locked loop synthesizer. The signal from frequency source 110 is tunable over a range starting at 3,825 MHz and stepping to 4,295 MHz (239 stepped frequencies). At any stepped frequency, the signal is reasonably spectrally pure, at least to the extent achievable with a direct digital synthesizer or a phase locked loop synthesizer.

When implemented as a single filter, filter 130 requires a relatively flat frequency response over a frequency range from 4,620 MHz to 5,100 MHz and steep "skirts" (particularly on the lower frequency side) to reject any frequency component from the pump signal from frequency source 110. When frequency source 110 is tuned to the lower frequency end of its tuning range (i.e., 3,825 MHz in this example), there is a 795 MHz frequency gap between the pump signal and the lower frequency end of the bandpass of filter 130. However, when frequency source 110 is tuned to the upper frequency end of its tuning range (i.e., 4,295 MHz in this example), there is only a 325 MHz frequency gap between the pump signal and the lower frequency end of filter 130.

Removal of the pump signal from the output of filter 130 is desired in order to prevent the pump signal from leaking through mixer 120 and through filter 130 to mix with a strong, off frequency, signal picked up by antenna 104. The pump signal is removed by either good isolation in single sideband mixer 120, or good band rejection by filter 130, or both. The filter "skirt" on the lower frequency end of the pass band may be required to drop 30 dB in just 325 MHz on the 4,620 MHz end of the bandpass. This is a 30 dB drop in just 7% of the bandwidth. Such a single filter will require at least 14 "polls" to achieve. Present filter technologies in the 4,600 to 5,100 MHz region use various types of stripline filters, microstrip filters, waveguide filters, coax filters, and the like.

Dielectric resonator filters (DR filters) are promising in this frequency range, but DRs have such high Q values that many such separately tuned filters would be required to cover the 4,620 MHz to 5,100 MHz bandpass of filter 130. Preferably, 239 separately tuned DR filters (having a Q of about 1000) are tuned to the specific frequencies desired in the output of filter 130 when corresponding frequency steps are selected by frequency source 110. Hybrid filters can also be formed by combining DR filters and various types of stripline filters, microstrip filters, waveguide filters, coax filters, and the like.

Of course, there is no reason why filter 130 needs to be a single filter. Filter 130 may be constructed as several narrower band filters (e.g., 239 separately trimmed or tuned DR filters) with switching between the filters synchronized to the selection of frequency in frequency source 110.

Filters 150 and 170 are preferably constructed from DR filters (high Q filter) that operates in the desired frequency range (in this example, 7,620 and 6,820 MHz). In a filter designated to pass a bandwidth of 2 MHz (e.g., the +/−1 MHz frequency range of the emitter signal), a Q of about 1500 would be desired. Such filters include DR filters and some ceramic resonators, but there are many alternatives. Filter 190 can be of an extremely high Q design since the signal bandwidth at the output of filter 190 is only a few Hertz: 1 Hertz in this example. A Q of over 200 million could be used if such filter and resonator were available and could be trimmed accurately to the frequency of intermediate reference signal 302 (about 800 MHz in this example). Generally, a SAW based filter or a high Q DR filter will perform well in filter 190, but there are alternatives.

In the wide band example discussed with respect to FIG. 2, and due to the possibility of leakage of the pump signal (from frequency source 110) through mixer 120 and filter 130 into mixer 140, filter 130 is an important design issue. Requirements for this filter can be relaxed if the tunable bandwidth of frequency source 110 is made more narrow, or if intermediate reference signal 302 is made to have a higher frequency. In either case, the difference between the highest pump signal frequency and the lower frequency end of the pass band of filter 130 is widened which relaxes the requirement on the steepness of the filter "skirts" of filter 130.

Figure 4:
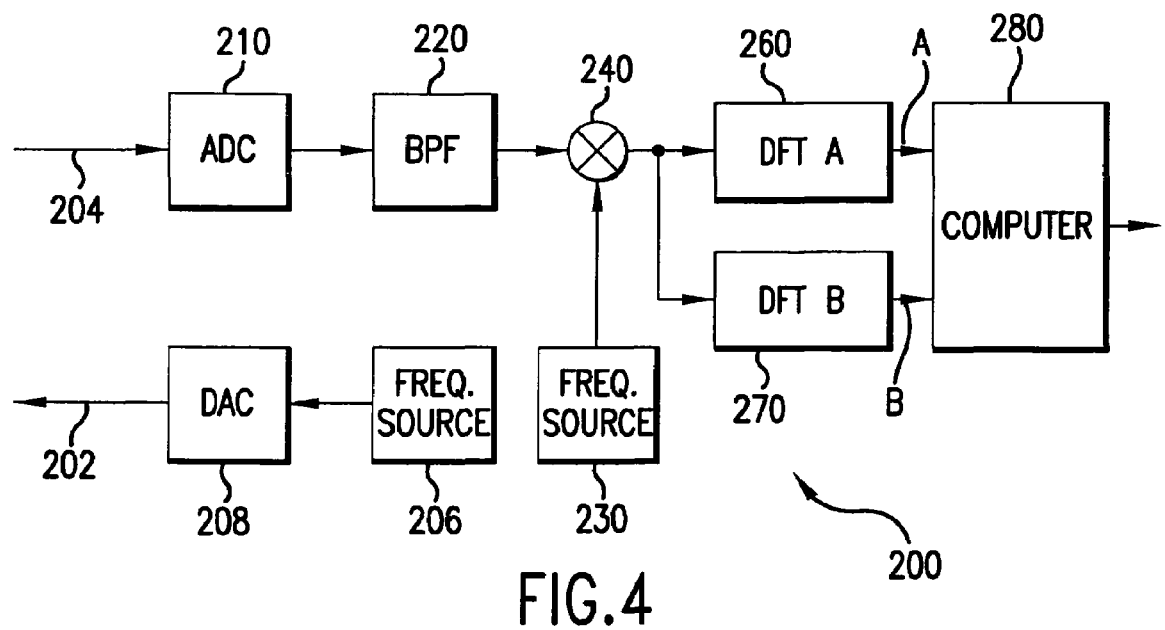
FIG. 4 is a block diagram of a processor of the present invention.

In FIG. 4, processor 200 includes digital frequency source 206 and digital to analog converter 208 (DAC 208) to produce processor reference signal 202. Collectively, frequency source 206 and DAC 208 constitute a direct digital synthesizer. In the examples discussed above, processor reference signal 202 is a spectrally pure 8 MHz signal. Processor 200 further includes analog to digital converter 210 (ADC 210) to receive the down converted information signal (FIG. 2) or the information signal (FIG. 1) as processor input signal 204. In the examples discussed above, signal 204 is an 8 MHz signal onto which has been modulated a frequency difference signal, the frequency difference signal being the difference in frequency between the emitter signal received at antenna 102 and the emitter signal received at antenna 104. This frequency difference is typically of the order of 1 Hertz under the circumstances described in the examples herein.

In the examples discussed above, ADC 210 samples signal 204 at 16 MSPS (million samples per second). Each sample is preferably a complex sample with a 12 to 14 bit resolution for each complex part, and the output is filtered through digital bandpass filter 220. Filter 220 removes any bias or offset (dc offset) that may appear in physical realizations of ADC 210. An example of filter 220 is described in more detail below. The sampling process of ADC 210 may fold out-of-band frequencies into the desired frequency band of ADC 210 in a process called aliasing. To avoid undesired alias frequencies being processed, either filter 190 (FIG. 3, discussed above) or filter 350 (discussed with respect to FIG. 5) is carefully designed to include the anti-aliasing filter function (i.e., removing frequencies that might be aliased into the desired frequency band).

In FIG. 4, digital frequency source 230 provides a "local oscillator" signal having a frequency that is the sum of the frequency of processor reference signal 204 and an offset frequency. In the example discussed herein, the offset frequency is 64 Hz. The "local oscillator" signal is in digital form. Preferably, the "local oscillator" signal is a sinusoidal wave represented by complex digital numbers at a predetermined sample rate that matches the sample rate at the output of filter 220. In the present example, ADC 210 samples its input signal at 16 MSPS (million samples per second) and filter 220 filters the signal using a 16 MHz clock frequency to process the 16 MSPS from ADC 210 through filter 220. The "local oscillator" signal is a digitally sampled 8 MHz sinusoidal wave that is sampled at 16 MSPS. Preferably, all digital representations of the various signals are complex numbers.

The offset frequency discussed above is 64 Hz in this example. The weight signals for DFT A and DFT B are sinusoidal signals at frequencies above and below this offset frequency. DFTs A and B are discussed in more detail below. In FIG. 4, mixer 240 mixes the "local oscillator" signal from frequency source 230 with the information signal in digital form as processed through filter 220 (e.g., carried on an offset frequency subcarrier). Mixer 240 preferably includes a single sideband mixer that provides the lower sideband result. The digital signal produced by mixer 240 has the difference signal (i.e., a signal at a frequency that is the difference between the frequency of signals received at antennas 102 and 104) modulated on the offset signal subcarrier (the difference between frequencies produced by frequency sources 206 and 230), a 64 Hz signal in this example. The difference signal has a frequency that varies from zero to about +/−1 Hz in this example or to as much as +/−5 Hz difference between emitter signals received at antennas 102 and 104.

The digital signal produced by mixer 240 is processed by discrete Fourier transforms 260 and 270 (DFTs 260 and 270). DFT 260 uses a weight signal at 96 Hz in this example, and DPT 270 uses a weight signal at 32 Hz in this example. Accumulators within DFT 260 are reset at the beginning of a DFT integration time period and then allowed to accumulate over the DFT integration time period. At the end of the DFT integration time period, computer 280 samples the accumulator of DFT 260 (output denoted A) and the accumulator of DFT 270 (output denoted B). Computer 280 computes the frequency difference between frequencies of the signals received at antennas 102 and 104 and multiples this by a constant to determine the angle of rotation of direction 108 (FIG. 1) since the frequency difference is proportional to an angle rate of rotation with respect to the line of sight to the emitter.

Figure 5:
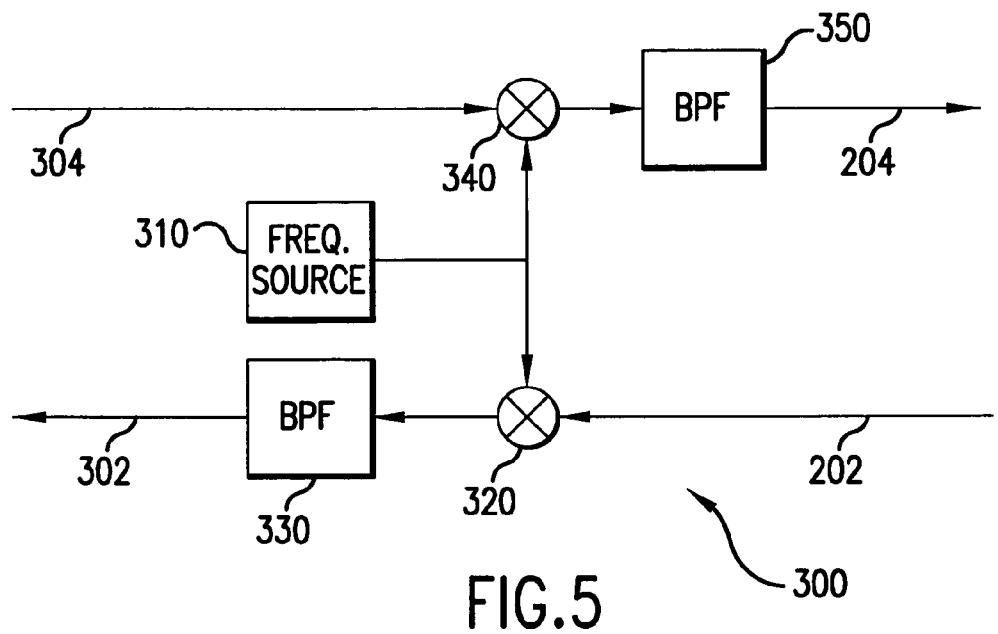
FIG. 5 is a block diagram of a frequency converter of the present invention.

In FIG. 5, frequency converter 300 includes common frequency source 310 to provide a reference signal for both up conversion and down conversion. Frequency converter 300 also includes mixer 320 (preferably an upper sideband single sideband mixer) and bandpass filter 330 that together comprises an up converter. Frequency converter 300 also includes mixer 340 (preferably a lower sideband single sideband mixer) and bandpass filter 350 that together comprise a down converter. In an example discussed above, frequency source 310 provides a 792 MHz "local oscillator" signal to pump both mixers 320 and 340, and processor reference signal 202 is provided as an 8 MHz signal. Intermediate reference signal 302 is therefore produced as an 800 MHz signal. Information signal 304 is a signal having a frequency of about 800 MHz plus a small frequency difference. Down converted information signal 204 is therefore produced as an 8 MHz signal with the small frequency difference frequency modulated thereon.

Figure 6:
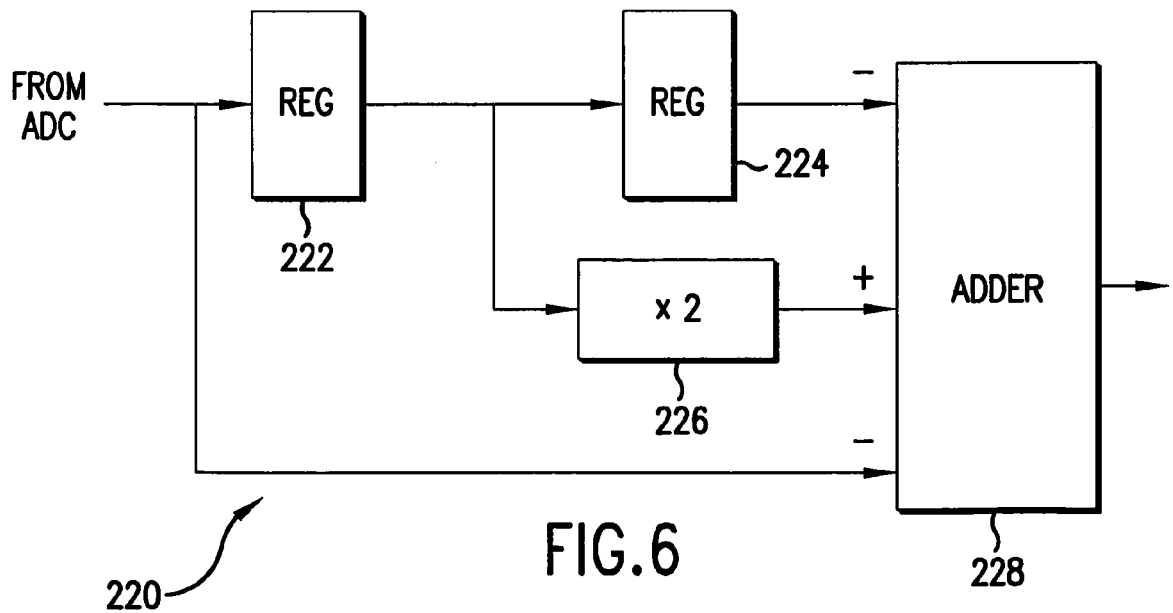
FIG. 6 is a block diagram of a digital filter of the present invention.

In FIG. 6, exemplary filter 220 includes a digital delay line that includes series connected registers 222 and 224 as well as shift circuit 226 (to be used as a multiply by two circuit) and adder 228. The registers are "clocked" at the same sample rate as used to clock ADC 210. The connection between registers 222 and 224 is also connected to multiply by two circuit 226. Actually, this is just a shift of one place in the data at the connection between registers 222 and 224. Then, the outputs from registers 222 and 224 are made negative and added to the output of shift circuit 226 in adder 228.

A Fourier transform of arbitrary signal f(t) is defined to be $F(\omega)$. Let signal f(t) be the output of register 222. The output of register 224 would then be given by $f(t-t_0)$ where $t_0$ is the clocking repeat interval, in this example, the inverse of 16 MSPS. Similarly, the input to register 222 (the output of ADC 210) is given by $f(t+t_0)$. The Fourier transform of the input to register 222 and the output of register 224 would be given by $F(\omega)e^{-j\omega t_0}$ and $F(\omega)e^{+j\omega t_0}$, respectively. The sum of $F(\omega)e^{-j\omega t_0}$ and $F(\omega)$ and $F(\omega)e^{+j\omega t_0}$ is $[1-\cos(\omega t_0)]$. Thus, the transfer function of filter 220 has a peak when $\omega t_0 = \pi$ and is zero when $\omega t_0 = 2\pi$ or zero. Since in this example, $\omega = 2\pi$ times 8 MHz, and $t_0 =$ the inverse of 16 MSPS, the peak of the transfer function is at 8 MHz and there is zero transfer at dc. This will remove any dc bias that may exist in the output signal from ADC 210. Persons skilled in the art will appreciate in light of these teachings that other digital filters may be used as filter 220.

Processor 200 is preferably a digital signal processor coupled to a general purpose computer. However, processor 200 may be implemented out of discrete digital multipliers, adders and the like, or integrated together on a custom circuit such as an application specific integrated circuit (ASIC). In any event, performing digital processing at 16 MSPS consumes processing capacity, and where permitted, it is desirable to minimize the procession capacity required. This is generally performed by down sampling.

One way to down sample is to use an integrate and dump filter. For example, two consecutive input samples at 16 MSPS are added together and then the sum is output once. Then, the next two input samples are added together and output once, and so forth. In this example, the output of the integrate and dump filter would be a sequence of samples at 8 MSPS (i.e., the Nyquist rate for complex sampling of an 8 MHz signal).

Figure 7:
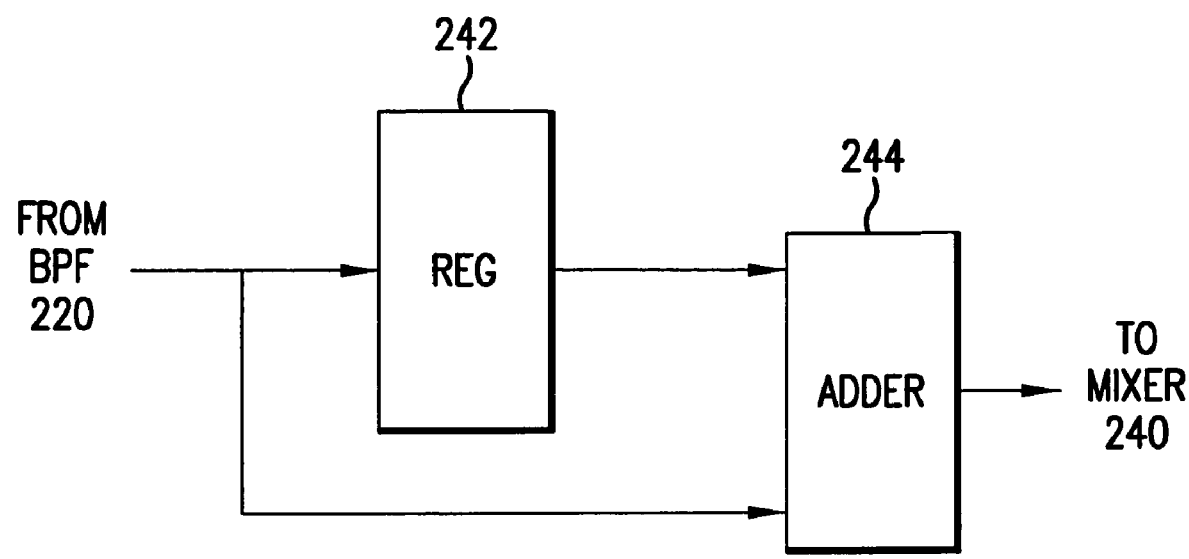
FIG. 7 is a block diagram of a down sample circuit of the present invention.

In FIG. 7, an integrate and dump filter is preferably, but not necessarily, coupled between filter 220 and mixer 240. The signal from filter 220, in the form of a sequence of complex numbers at 16 MSPS, is applied to both register 242 and a first input of complex adder 244. Register 242 is clocked at 16 MSPS in this example so that the output of register 242 is a delayed replica of the signal at its input. The delay is one clock period or the inverse of 16 MSPS in this example. The output of register 242 is applied to a second input of complex adder 244. The additive sum from complex adder 244 is sampled at only 8 MSPS (i.e., a 2:1 down sample). In operation, register 242 operates as a delay line where the delay is the inverse of the clock rate or the inverse of 16 MSPS in this example. This process combines the 16 MSPS samples in pairs and reports out an average of the pair of the two samples that makes up the pair.

Figure 8:
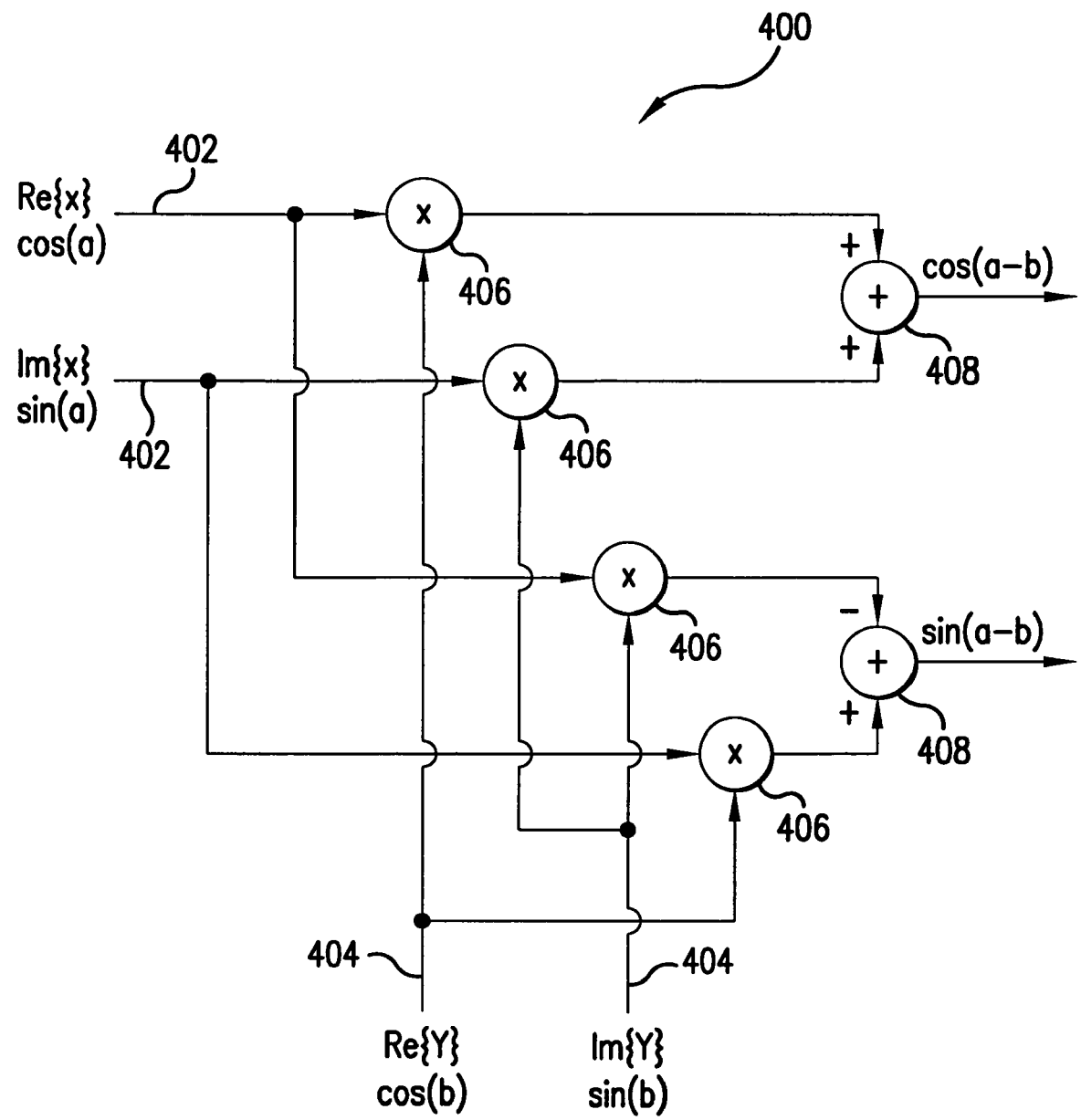
FIG. 8 is a block diagram of a single sideband frequency converter of the present invention.

In FIG. 8, single sideband down converter 400 is one possible implementation of mixer 240 of FIG. 4. Down converter 400 includes four identical real by real multipliers 406A, 406B, 406C and 406D and two identical read adders 408A and 408B. Adder 408A adds the signals from multipliers 406A and 406B as indicated in FIG. 8. However, adder 408B subtracts the signal from multiplier 406C from the signal from multiplier 406D as indicated in FIG. 8.

Down converter 400 mixes a first input signal X on inputs lines 402 with a second input signal Y on input lines 404, both complex numbers. The real component of signal X is Re{X} and the imaginary component of signal X is Im{X}. X may be represented by:

$$X = \cos(a) + j\sin(a), \quad (1)$$

where cos(a)=Re{X} and sin(a)=Im{X}. Similarly, the real component of signal Y is Re{Y} and the imaginary component of signal Y is Im{Y}. Y may be represented by:

$$Y = \cos(b) + j\sin(b), \quad (2)$$

where cos(b)=Re{Y} and sin(b)=Im{Y}.

Signal X on input lines 402 is the signal from filter 220 sampled at 16 MSPS (or the signal from the down sampler of FIG. 7 at 8 MSPS). Signal Y on input lines 404 is the signal from frequency source 230 sampled at 16 MSPS (or 8 MSPS depending on the sample rate of the signal on input lines 402). The combined output of down converter 400 provides cos(a−b) as the output from adder 408A and provides sin(a−b) as the output from adder 408B. Down converted signal Z is then given by:

$$Z = \cos(a-b) + j\sin(a-b). \quad (3)$$

When down converter 400 is used as mixer 240, the output of mixer 240 has a frequency that is the difference between the frequency of the signal from filter 220 sampled at 16 MSPS, if no down sampling is used (or the signal from the down sampler of FIG. 7 at 8 MSPS, if down sampling used), and the "local oscillator" signal from frequency source 230 (see FIG. 4). As discussed above, the "local oscillator" signal has a frequency equal to the frequency of signal 204 plus the offset frequency. In the examples discussed herein, the frequency of signal 204 is 8 MHz and the offset frequency is 64 Hz. The output signal from mixer 240 has the frequency of the offset frequency plus any frequency deviation caused by the difference in the frequencies of the signals received by antennas 102 and 104. It is this small frequency deviation that is to be measured.

Figure 9:
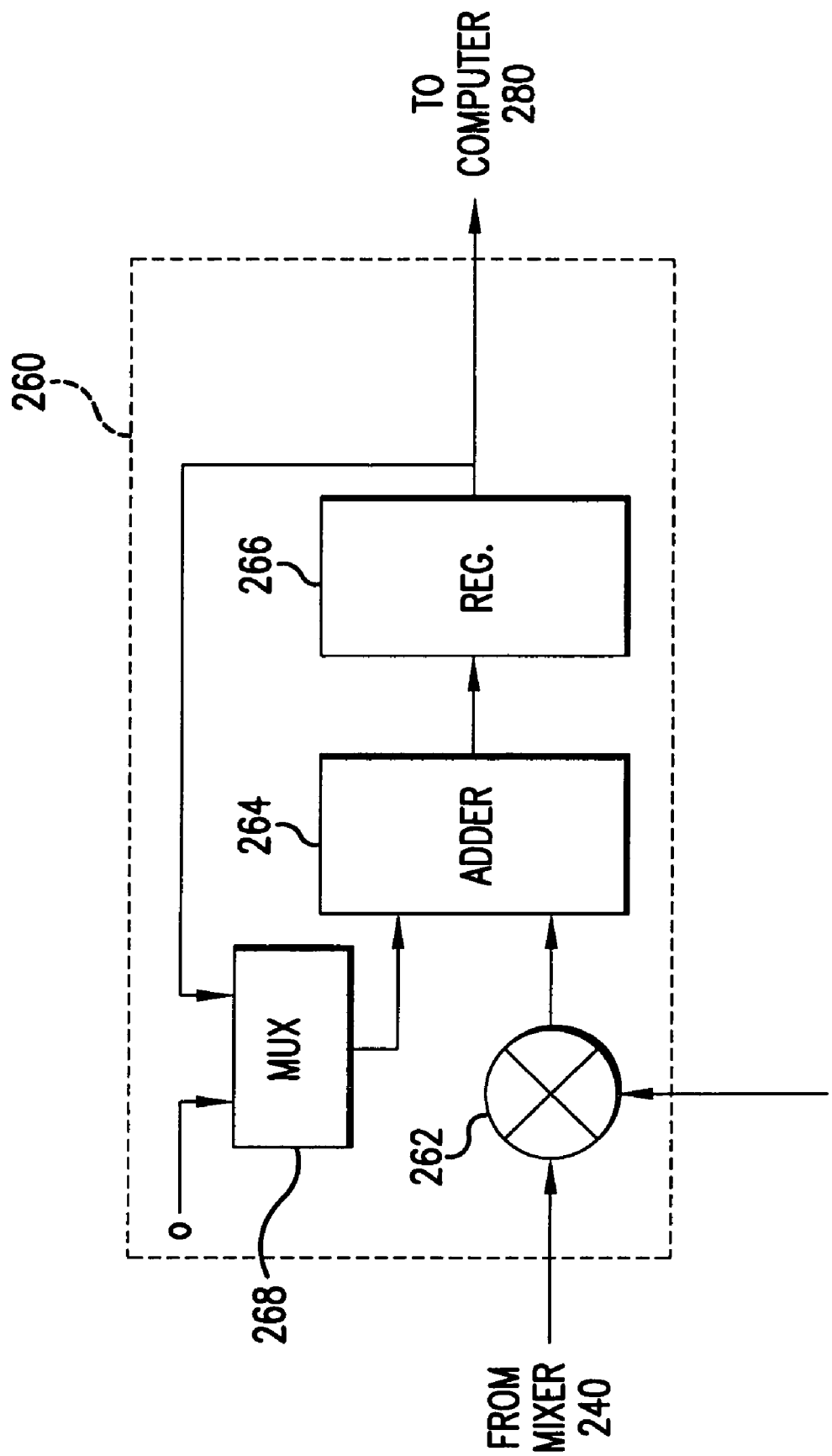
FIG. 9 is a block diagram of a Fourier transformer of the present invention.

In FIG. 9, FFT 260 includes complex by complex multiplier 262, complex adder 264, accumulation register 266 and multiplier 268. The signal from mixer 240 is multiplied by a weight (from frequency source 230) in multiplier 262. During the first clock period of an integration interval, multiplexer 268 is set to provide zero to adder 264, and the complex product from multiplier 262 is passed unchanged through adder 264 and set into register 266. During subsequent clock periods of the integration interval, multiplexer 268 is set to provide the value stored in register 266 to a first input of adder 264, and the complex product from multiplier 262 is provided to the second input of adder 264 to be added to the complex value from register 266. The complex sum from adder 264 is then stored in register 266 for the next clock period.

With this arrangement, the weighted signal from mixer 240 is accumulated in register 266. At the end of the integration interval, the output of register 266 is sampled by computer 280 as a discrete Fourier transform of the signal from mixer 240 at a frequency defined by the weight signal. The weight signal is a sequence of digital numbers representing a sinusoidal wave at the center frequency of the discrete Fourier transform. Referring to FIG. 4, DFT 260 is preferably tuned to have a center frequency of 32 Hz and output complex accumulated value A at the end of the integration interval. DFT 270 is preferably tuned to have a center frequency of 96 Hz and output complex accumulated value B at the end of the integration interval. The Fourier transforms developed at these center frequencies evenly bracket the offset frequency (64 Hz in this example).

Computer 280 determines the actual frequency difference between frequencies of the signals received at antennas 102 and 104. Denote the DFT integration time interval as T. A discrete Fourier transform (DFT) using a weighting function of frequency $\omega_0 + \delta\omega$ (DFT 260, FIG. 4) produces a Fourier transform value A of:

$$\frac{\sin(\omega - \omega_0 - \delta\omega)}{(\omega - \omega_0 - \delta\omega)} \quad (4)$$

where $\omega_0$ is the offset frequency ($2\pi$ times 64 Hz in this example) and $\delta\omega$ is a displacement ($2\pi$ times 32 Hz in this example) of the DFT center frequency from the offset frequency. A discrete Fourier transform (DFT) using a weighting function of frequency $\omega_0 - \delta\omega$ (DFT 270) produces a Fourier transform value B of:

$$\frac{\sin(\omega - \omega_0 + \delta\omega)}{(\omega - \omega_0 + \delta\omega)} \quad (5)$$

Set $\delta\omega$ equal to $\pi/(2T)$ where T is the accumulation interval. The above example discussed with respect to FIG. 3 assumes that $\delta\omega$ is $2\pi$ times 32 Hz and that $\omega_0$ is $2\pi$ times 64 Hz. Therefore, T in seconds is $\pi/64$ or about 49 milliseconds. With the integration time T related to $\delta\omega$ in this way, it can be shown that the actual frequency difference between frequencies of the signals received at antennas 102 and 104 is given by:

$$\omega - \omega_0 = \frac{\pi(A-B)}{2T(A+B)} \quad (6)$$

where A is the accumulated output of DFT 260 and B is the accumulated output of DFT 270.

Figure 10:
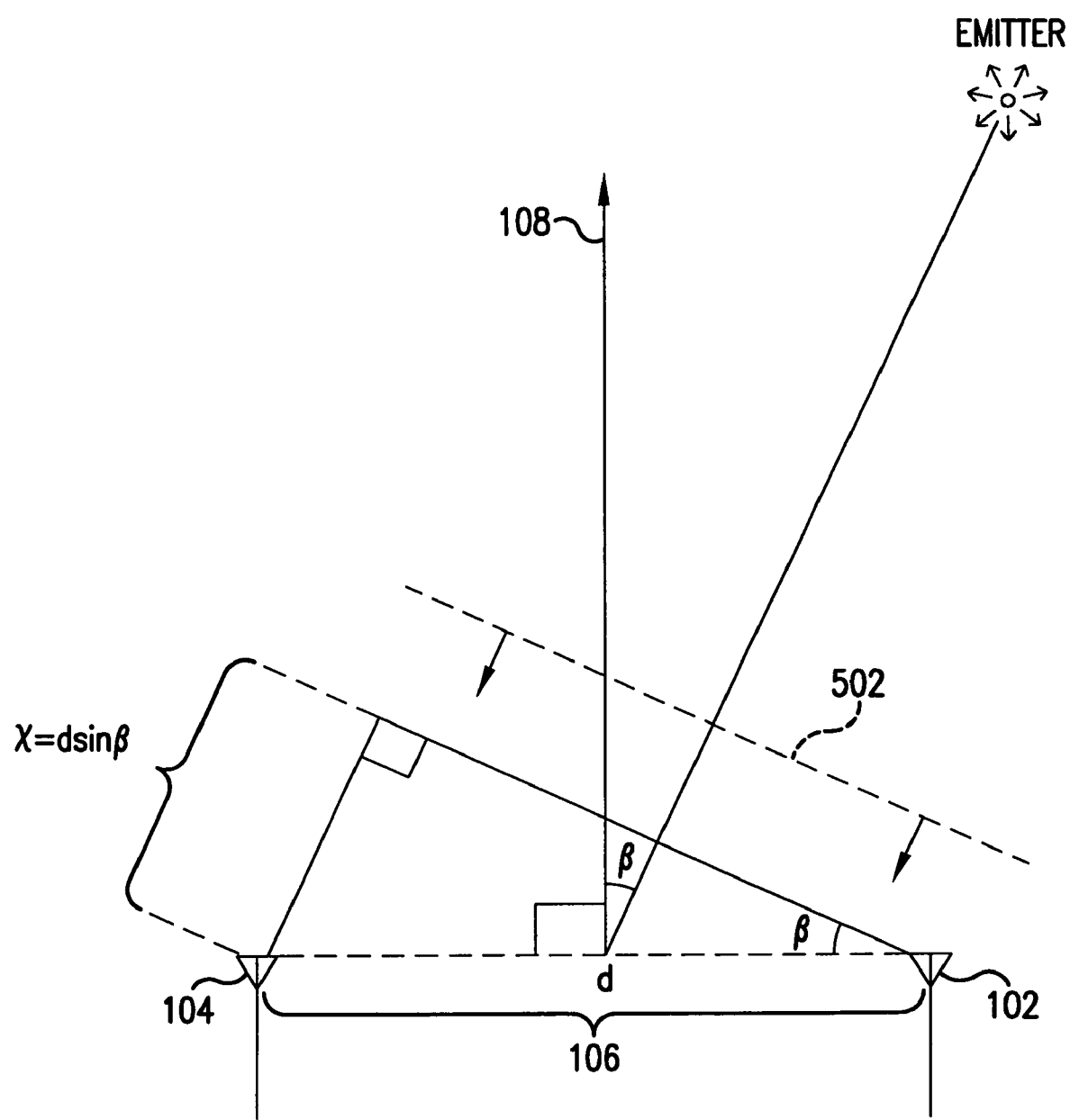
FIG. 10 is a schematic diagram of a static plan view of the geometry of the angle rate interferometer of the present invention.

In FIG. 10, antennas 102 and 104 are spaced apart over baseline 106 by length d. Baseline 106 is perpendicular to direction 108, and direction 108 forms angle β with a line of sight from baseline 106 to the EMITTER. The EMITTER is at such a great distance that wavefront 502 from the EMITTER appears as a straight line that intersects baseline 106 at angle β. In FIG. 10, antenna 102 is closer to the EMITTER than antenna 104 by distance x=d sin β. The electrical phase change over distance x is given by θ=[2π/λ]x=[2π/λ]d sin β where λ is the wavelength of the signal from the EMITTER. Computing the time derivative of θ where β also varies with time results in:

$$\dot{\theta} = \omega - \omega_0 = \frac{2\pi}{\lambda} d \cos\beta \, \dot{\beta}. \quad (7)$$

Here, the time rate of change of θ (i.e., dθ/dt) is the frequency difference (in radians per second) observed between the signal received at antenna 102 and the same signal received at antenna 104 (i.e., $\omega - \omega_0$).

Computer 280 (FIG. 4) receives an input of λ, β and d from some outside source. For example, d is a predetermined constant for a given design. Wavelength λ is a constant to which the system was designed (e.g., a single frequency narrow band system), a parameter selected based on the frequency selected by frequency source 110 of FIG.

3 (e.g., a multi frequency stepped wide band system) or a parameter measured by an intercept receiver. Angle β is an angle measured by an associated angle interferometer or a monopulse angle discriminator (similar to an automatic direction finder). With λ, β and d known and dθ/dt measured as ω–ω₀, computer 280 can compute dβ/dt.

Figure 11:
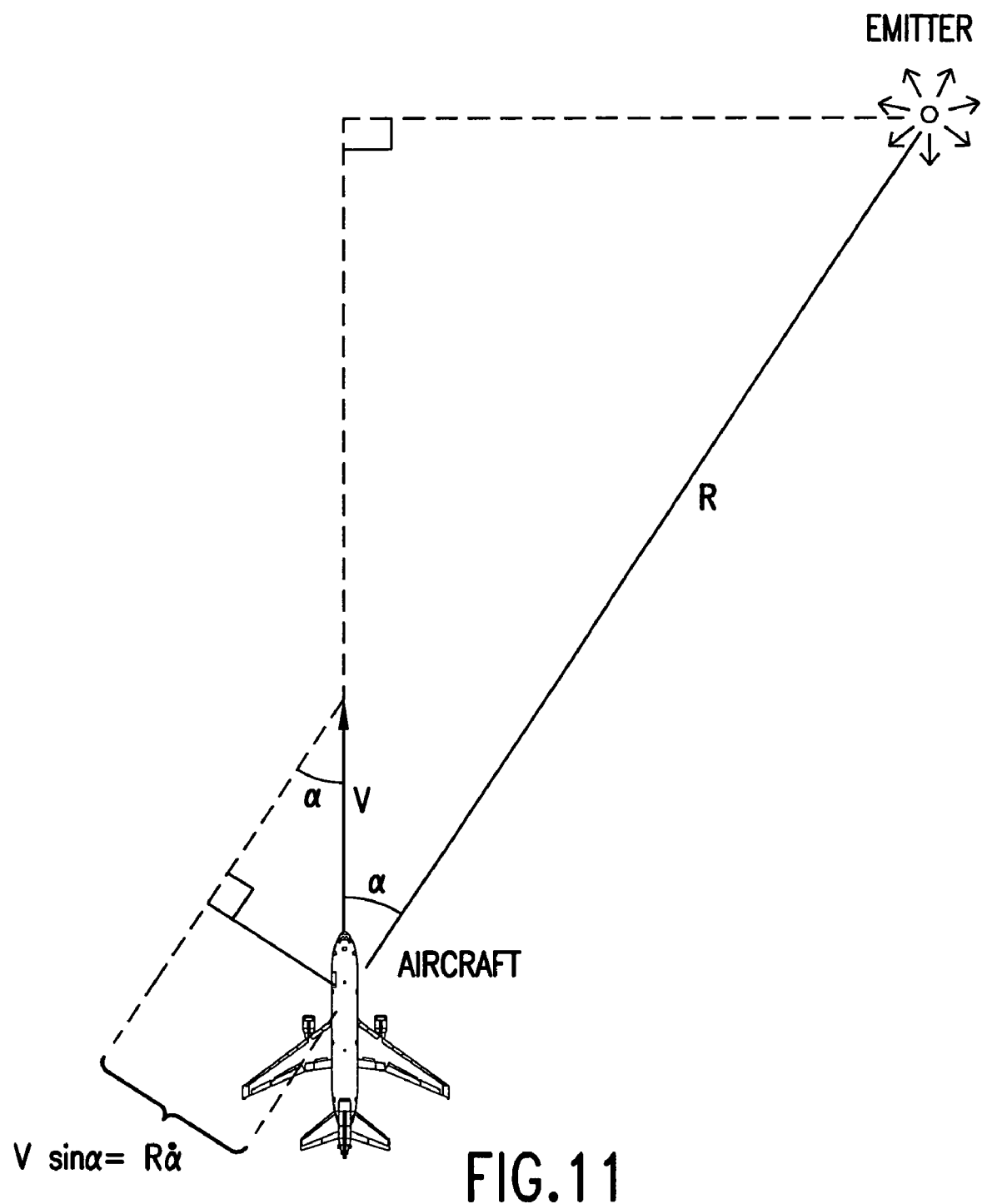
FIG. 11 is a schematic diagram of a dynamic plan view of the geometry of the angle rate interferometer of the present invention.

In FIG. 11, an AIRCRAFT at range R from the EMITTER flies at velocity V obliquely toward or away from the EMITTER at angle α to a line of sight to the EMITTER. The tangential component of the AIRCRAFT's velocity V is V sin α=R [dα/dt].

Figure 12:
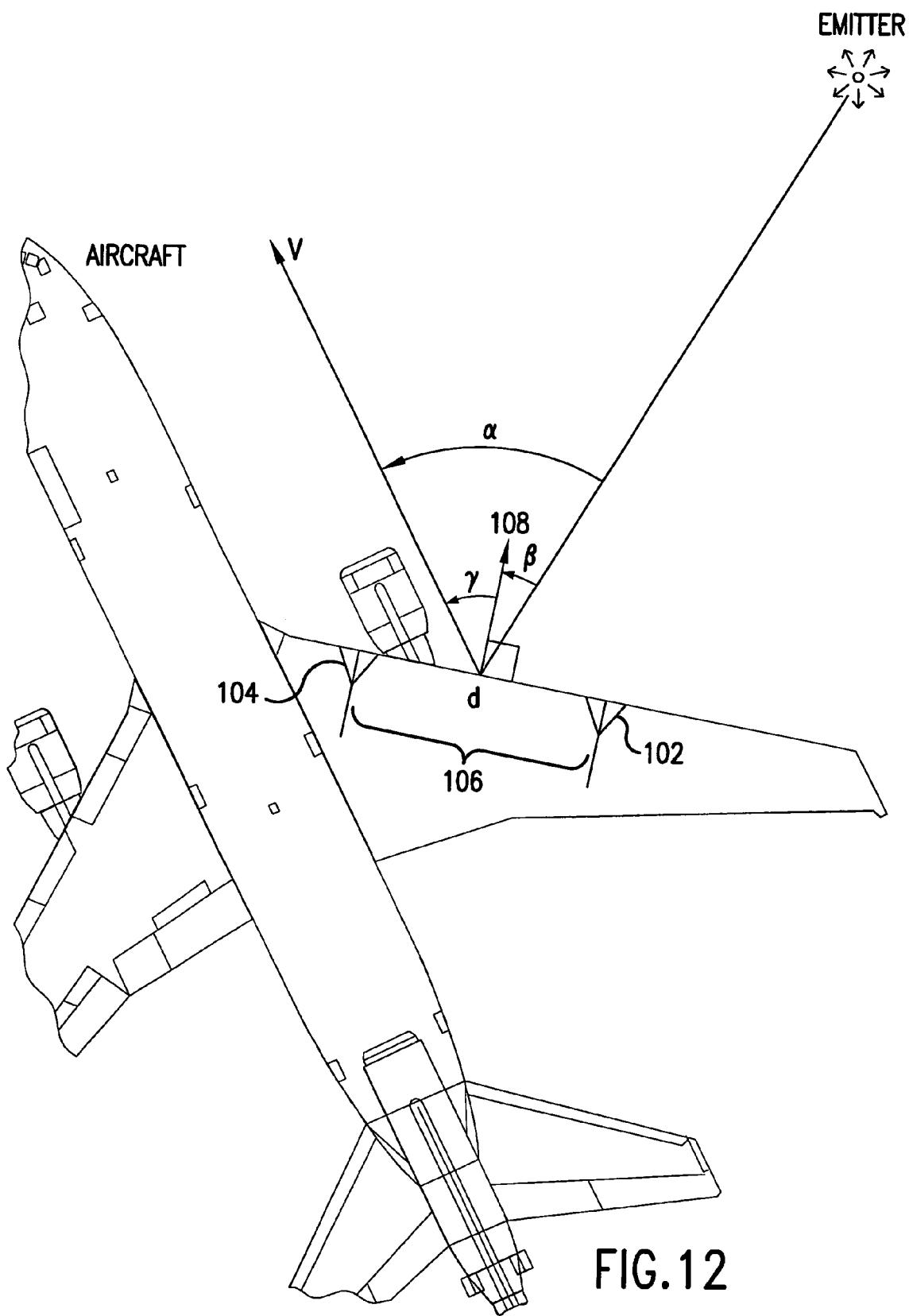
FIG. 12 is a schematic diagram of the relation between the dynamic and static plan views of the geometry of the angle rate interferometer of the present invention.

As depicted in FIG. 12, angles α and β are generally different depending on the mounting orientation of baseline 106 with respect to the AIRCRAFT's flight direction as represented by the direction of velocity V. As a general matter, α minus β equals γ. Generally, γ is a known predetermined constant over the time intervals involved in the measurement so that dα/dt equals dβ/dt and V sin α equals R [dβ/dt].

With the AIRCRAFT's velocity V known from an external navigation system (e.g., an inertial navigation system), computer 280 computes range R based on inputs V, β, γ and d and the measured frequency difference ω–ω₀ as follows:

$$R = V \sin(2\beta + \gamma) \frac{\pi d}{\lambda} \frac{1}{\omega - \omega_0} + V \sin(\gamma) \frac{\pi d}{\lambda} \frac{1}{\omega - \omega_0} \quad (8)$$

where the first term is a function of the measured frequency difference ω–ω₀ and the angle β, and the second term is substantially constant.

For a passive ranger to be of value, the inputs V, λ, β, γ and d and the measured frequency difference ω–ω₀ must be determined to an accuracy sufficient to achieve a desired range accuracy. For example, the range uncertainty ΔR may be desired to be no more than 20% of range R. This accuracy has an impact on the accuracy to which other parameters must be determined. As it turns out, a modern inertial navigation system (INS) can track velocity V to an accuracy more than sufficient to eliminate velocity uncertainty ΔV as a significant contributor to range uncertainty. Modern intercept radios can measure wavelength λ to an accuracy in excess of what is needed to eliminate wavelength uncertainty Δλ as a significant contributor to range uncertainty. The baseline length d and angle γ are known to an accuracy sufficient to eliminate baseline uncertainty Δd and angle uncertainty Δγ as contributors to range uncertainty. This leaves two factors to be concerned with: angle uncertainty Δβ and frequency difference uncertainty Δ(ω–ω₀). The range uncertainty ΔR as a fraction of range R is determined by forming the differentials of range R with respect to angle uncertainty Δβ and with respect to frequency difference uncertainty Δ(ω–ω₀) and then normalizing this with respect to range R:

$$\frac{\Delta R}{R} = \frac{\partial R}{\partial \beta} \frac{\Delta \beta}{R} + \frac{\partial R}{\partial(\omega - \omega_0)} \frac{\Delta(\omega - \omega_0)}{R} \quad (9)$$

so that when angle γ is sufficiently small that the second term of range R can be ignored:

$$\frac{\partial R}{\partial \beta} \frac{1}{R} = 2\cot(2\beta + \gamma) \quad (10)$$

and $$\frac{\partial R}{\partial(\omega - \omega_0)} \frac{1}{R} = \frac{1}{(\omega - \omega_0)}. \quad (11)$$

Therefore:

$$\frac{\Delta R}{R} = 2\cot(2\beta + \gamma)\Delta\beta - \frac{\Delta(\omega - \omega_0)}{(\omega - \omega_0)}. \quad (12)$$

For example, to achieve a range accuracy of [ΔR/R]=20% requires a trade-off between angle β, angle uncertainty Δβ and frequency difference uncertainty Δ(ω–ω₀) as illustrated in Table 1.

TABLE 1

| β (degrees) | Δβ (degrees) | 2cot(β) Δβ | $\frac{\Delta(\omega-\omega_0)}{(\omega-\omega_0)}$ | $\frac{\Delta R}{R}$, |
|---|---|---|---|---|
| 22.5 | 1 | 0.084 | 0.182 | 0.2 |
| 22.5 | 2 | 0.169 | 0.107 | 0.2 |
| 22.5 | 3 | 0.253 | 0.060 | 0.26 |
| 30 | 1 | 0.060 | 0.191 | 0.2 |
| 30 | 2 | 0.121 | 0.159 | 0.2 |
| 30 | 3 | 0.181 | 0.085 | 0.2 |
| 45 | 1 | 0.035 | 0.197 | 0.2 |
| 45 | 2 | 0.070 | 0.187 | 0.2 |
| 45 | 3 | 0.105 | 0.170 | 0.2 |
| 60 | 1 | 0.020 | 0.199 | 0.2 |
| 60 | 2 | 0.040 | 0.196 | 0.2 |
| 60 | 3 | 0.060 | 0.191 | 0.2 |

Note that range accuracy is more difficult to achieve at a smaller angle β. In fact, at β=22.5 degrees and Δβ=3 degrees, it is not possible to achieve a 20% range accuracy.

In a representative use, an aircraft may fly at about 480 knots (i.e., about 800 feet per second) so that V=243.84 meters per second. Assuming the EMITTER transmits at 3 GHz, then λ=0.1 meters. Assuming that range R is 10 kilometers and baseline d is 2 meters, then the frequency difference (ω–ω₀) given by:

$$\omega - \omega_0 = V \sin(\beta) \frac{\pi d}{\lambda} \frac{1}{R} \quad (13)$$

is $$\omega - \omega_0 = 1.532 \sin(\beta). \quad (14)$$

As can be seen in Table 2, the frequency difference (ω–ω₀) is very small and the required frequency difference accuracy Δ(ω–ω₀) is even smaller.

TABLE 2

| β (degrees) | Δβ (degrees) | (ω – ω₀) (Hertz) | $\frac{\Delta(\omega-\omega_0)}{(\omega-\omega_0)}$ | Δ(ω – ω₀) (Hertz) |
|---|---|---|---|---|
| 22.5 | 1 | 0.586 | 0.182 | 0.107 |
| 22.5 | 2 | 0.586 | 0.107 | 0.063 |
| 22.5 | 3 | 0.586 | 0.060 | 0.035 |
| 30 | 1 | 0.766 | 0.191 | 0.146 |
| 30 | 2 | 0.766 | 0.159 | 0.122 |

TABLE 2-continued

| β (degrees) | Δβ (degrees) | (ω − ω₀) (Hertz) | $\frac{\Delta(\omega-\omega_0)}{(\omega-\omega_0)}$ | Δ(ω − ω₀) (Hertz) |
|---|---|---|---|---|
| 30 | 3 | 0.766 | 0.085 | 0.065 |
| 45 | 1 | 1.083 | 0.197 | 0.213 |
| 45 | 2 | 1.083 | 0.187 | 0.203 |
| 45 | 3 | 1.083 | 0.170 | 0.184 |
| 60 | 1 | 1.327 | 0.199 | 0.264 |
| 60 | 2 | 1.327 | 0.196 | 0.260 |
| 60 | 3 | 1.327 | 0.191 | 0.253 |

Prior art systems require long time periods in order to measure this the frequency difference to a required accuracy $\Delta(\omega-\omega_0)$. The present invention recognizes that there may be only 50 milliseconds or so during which to make all measurements. The frequency differences $(\omega-\omega_0)$ from Table 2 vary from only 0.59 Hz to 1.33 Hz. At 0.59 Hz, 50 milliseconds represents only 11 degrees of phase. At 1.33 Hz, 50 milliseconds represents only 24 degrees of phase. In such a short measurement interval, it is difficult to measure frequency difference $(\omega-\omega_0)$ to the required frequency difference accuracy $\Delta(\omega-\omega_0)$. The angle rate interferometer disclosed herein, using an RF bridge structure, solves the problem of accurately measuring the frequency difference.

Noise imposes a limit on the accuracy of the measurement process. The performance of the angle rate interferometer is based on the signal to noise ratio of the signals received. Referring again to FIG. 3, mixers 140 and 160 preferably have a low noise amplifier (LNA) coupled between the antenna and the mixer input. In this example, the LNA has noise figure $N_f$ of 5 dB that is typical in the 3 GHz band. The signal bandwidth is initially limited by the bandwidth of filters 150 and 170 (in this example, assume 2 MHz or 63 dB referenced to one Hertz) and subsequently limited by the bandwidth of filter 190. The thermal noise into the mixer is given by:

$$\text{noise} = kT \cdot N_f \cdot B_f \quad (15)$$

where kT is −171 dBm (decibels referenced to one milliwatt per Hertz). Thus, the noise level is about −103 dBm for each of mixers 140 and 160. The combined noise from both mixers 140 and 160 is about −100 dBm.

The signal to noise ratio required for a given frequency accuracy is given by $$SNR = \frac{1}{2T(\Delta(\omega-\omega_0))^2} \quad (16)$$

where T is the time period over which coherent integration takes place and $\Delta(\omega-\omega_0)$ is the required frequency difference accuracy. In the example herein, T is 49 milliseconds. The required frequency difference accuracy $\Delta(\omega-\omega_0)$ is of the order of 0.15 to 0.2 Hertz. Assume that $\Delta(\omega-\omega_0)$ is 0.2, then, the required SNR is 255 (24.07 when expressed in dB).

The EMITTER may not be a constant beacon of radiation that provides a signal for the full duration of the DFT integration interval T. Often the EMITTER includes a scanning antenna that illuminates the phase rate interferometer for only a brief dwell time. For example, a representative EMITTER of this scanning type may be modeled from the description of the AN/TPS-70 described in the *The Radar Handbook*, second edition, published by McGraw Hill, Merrill Skolnik as editor, 1990, page 7.72. The EMITTER has a 1.6° azimuth and 4° elevation 3 dB beamwidth (i.e., an antenna gain of about 6,250 or 37.95 dB). Assuming that the scanning antenna completes a 360 degree revolution in 9 seconds, the dwell time during which the EMITTER illuminates the phase rate interferometer is only 40 milliseconds, not the full 49 milliseconds. The dwell time may be determined by providing a threshold circuit to detect when a sufficiently strong signal is being received by the phase rate interferometer.

The DFT integration interval is still preferably one-half π divided by the displacement frequency defined by δω but in Hertz (the difference between the center frequency of the DFT and the offset frequency defined by $\omega_0$) as discussed above with respect to equations (4), (5) and (6). In the example discussed herein, δω is π divided by 64, or 49 milliseconds. If the dwell time of the EMITTER is only 40 milliseconds, then the remaining 9 milliseconds of the DFT integration interval is filled with a balanced number of leading and trailing zero values for calculation purposes (so that the shape of the two discrete Fourier transforms combine to form a linear frequency discriminator). In the case of a 40 millisecond dwell time, the required signal to noise ratio is determined by Equation (16) as if T were 40 milliseconds even though the DFT filter function uses a 49 millisecond integration interval. The required SNR is 312.5 (24.95 dB).

The reason for using a DFT integration interval T equal to one-half π divided by the displacement frequency defined by δω but in Hertz is to provide a linear frequency discrimination function. However, small contractions or expansions of the interval T may be used as long as the frequency discrimination function remains substantially linear or correctable to be substantially linear. Corrections may be affected by adding a quadratic or higher order correction function to the frequency difference $(\omega-\omega_0)$ for each of the possible values of (A−B)/(A+B).

In general, the power flux (i.e., the power transmitted through a unit area) at range R from the EMITTER that transmits power $P_{96}$ through an antenna with gain $G_T$ is given by:

$$\frac{P_T G_T}{4\pi R^2}. \quad (17)$$

A receive antenna having gain $G_R$ has an effective aperture of:

$$\frac{G_R \lambda^2}{4\pi} \quad (18)$$

where λ is the wavelength of the radiation received, and the signal received by the receive antenna is $$S_R = \frac{P_T G_T}{4\pi R^2} \cdot \frac{G_R \lambda^2}{4\pi}. \quad (19)$$

In an exemplary EMITTER modeled after the description in the *The Radar Handbook*, second edition, published by McGraw Hill, Merrill Skolnik as editor, 1990, page 7.72, the EMITTER has an antenna gain $G_T$ of about 6,250 (i.e., 37.95 dB), a peak power of 3 megawatts and an average power of 5 kilowatts. The pulse repetition interval PRI is 600 times the pulse duration PD. In Equations (17) and (19), $P_T$ may be regarded as the average power (i.e., 5 kilowatts or 66.99 dBm referenced to one milliwatt). If λ is 0.1 meters (i.e., based on 3 GHz) and $G_R$ is taken to be 2 dB, then $S_R$ is −15 dBm (i.e., about 32 milliwatts). With a required SNR of 24.95 dB (based on a 40 millisecond dwell time), the noise level should not be allowed to rise above −40 dBm. In the exemplary embodiment described herein, the noise level is kept below −100 dBm.

The noise in the measurement process can be limited by appropriately designed filters. Filters 150 and 170 in the example herein are designed for a 2 MHz bandpass. However, broader bandpass filters may be used if the system noise is narrowed in other filters, for example filter 190. For example, if filter 190 were to be designed as a high quality DR filter with a Q of 20,000, then the band pass would be about 380 kilohertz. This would limit the noise bandwidth and lower the system noise to 19 percent of the noise of a 2 MHz noise bandwidth system (−7.21 dB). In such a case, the bandwidth of filters 150 and 170 could be opened up to pass 20 MHz signals. This has the advantage of being better able to measure a frequency switching EMITTER.

The ability to achieve 20% range accuracy is quite difficult. It is only by the use of the frequency differencing techniques described herein that it is possible to transfer the frequency difference sensed at antennas 102 and 104 to the digital frequency measuring circuitry that evaluates (A−B)/(A+B).

One source of this difficulty is the short dwell times that are available when intercepting a scanning antenna EMITTER. In the example herein, the dwell time is 40 milliseconds. Typically, this dwell time is parsed into three to five look times, for example, four look times averaging 10 milliseconds each. During each look time, the EMITTER transmits pulses repeated at a different pulse repetition interval (i.e., inverse of pulse repetition frequency PRF) so as to resolve ambiguous Doppler indicated velocities in low and medium PRF modes and so as to resolve ambiguous range reflections in medium and high PRF modes.

When switching from one look to another, the EMITTER frequency may also be switched. The angle rate interferometer described herein is not adversely effected by this form of frequency switching because it is only the frequency difference between the frequencies received at antennas 102 and 104 that is measured. Because of the pulse structure of the EMITTER's waveform, it is not possible to receive one frequency at antenna 102 and another frequency at antenna 104. On the occasional time when the measurement (ADC sampling) exactly corresponds to a time when one antenna receives signal power and the other antenna receives no signal power, the described angle rate interferometer treats the measurement as noise. If one were concerned with this occurrence, a signal power level threshold circuit may be installed at the outputs of mixers 140 and 160 to detect this condition and block the ADC sampling.

Even when the EMITTER's signal comes from a TV band broadcast, or similar source, with either FM or AM modulation thereon, to effect the described angle rate interferometer, the frequency modulation imparted to the signal from the EMITTER would have to change the carrier frequency fast enough so that the frequencies at antennas 102 and 104 are significantly different. This would depend on length d of baseline 106 and the angle of arrival β of the EMITTER's signal.

An angle rate interferometer as described herein may advantageously exploit signals from continuous wave sources to achieve longer integration times. Such sources include TV broadcasts, FM radio broadcasts, and VOR (VHS omni-directional ranging) broadcasts as are installed at many airports. The integration intervals for the DFTs are still defined by the center frequencies of the DFTs, and the integration time is short. However, the outputs of the DFTs may be saved in complex form (real and imaginary components) and then later recombined coherently using the time shifting property of Fourier transforms so that each measurement of A and B appears to have been made at the same time. The benefits of this long time averaging is at least partially offset by the shorter length (measured in the number of wavelengths) of interferometer baseline d that can be installed on an aircraft for these continuous wave sources since the continuous wave sources typically operate at lower frequencies.

According to an embodiment of the present invention, a receiver includes processor 200 and RF bridge 100. RF bridge 100 is coupled to processor 200 to receive reference signal 202 or intermediate reference signal 302. RF bridge 100 includes first and second frequency converters 140 and 160 coupled to respective first and second antennas 104 and 102. RF bridge also includes third frequency converter 180 coupled to outputs of the first and second frequency converters 140 and 160.

U.S. Pat. No. 3,090,957 to Albanese et al. (FIG. 4) discloses mixer 11 and mixer 12 coupled to respective antennas 3 and 4. However, Albanese et al. '957 does not disclose a third frequency converter coupled to mixers 11 and 12. Instead, Albanese et al. '957 discloses an adder coupled to mixers 11 and 12.

In RF bridge 100, the first and second frequency converters 140 and 160 receive respective first and second signals from the respective first and second antennas 104 and 102. The third frequency converter 180 heterodynes signals from the first and second frequency converters 140 and 160 to provide a signal that is characterized by a frequency difference modulated onto the reference signal. The frequency difference is a difference between a frequency of the first signal and a frequency of the second signal.

RF bridge 100 further includes frequency source 110 coupled to first frequency converter 140, and fourth frequency converter 120 coupled to reference signal 202 and coupled between frequency source 110 and second frequency converter 160. RF bridge 100 further includes filter 130 coupled between fourth frequency converter 120 and second frequency converter 140, the filter providing a stop band at a highest frequency of a signal from the frequency source and a pass band at a shifted frequency that is a sum of a frequency of the reference signal and a lowest frequency from the frequency source.

U.S. Pat. No. 3,789,410 to Smith et al. (FIG. 5) discloses two receivers coupled to respective antennas and driven by a common local oscillator. However, Smith et al does not disclose and offset mixer or filter such as presently disclosed as frequency converter 120 and filter 130 of RF bridge 100.

The claimed receiver advantageously includes up converter 320 and down converter 340. Up converter 320 is coupled between processor 200 and RF bridge 100 to frequency translate reference signal 202 by a predetermined frequency into intermediate reference signal 302 that is coupled to the RF bridge. Down converter 340 is coupled between RF bridge 100 and processor 200 to frequency translate information signal 304 from RF bridge 100 by a predetermined frequency into shifted information signal 204. The predetermined frequency is provided by frequency source 310.

In an alternative embodiment, a receiver includes RF bridge 100 and processor 200 coupled to the RF bridge to receive information signal 204 from the RF bridge. The processor includes a central clock source (not shown but common in digital designs), digital frequency source 206 to generate reference signal 202 based on a signal from the clock source, and reference signal 202 is coupled to RF bridge 100. The processor further includes circuitry to detect a frequency difference from the information signal based on the signal from the clock source (e.g., circuit parts 230, 240, 260, 270 and 280 of FIG. 4).

The circuitry to detect includes first Fourier transformer 260 having a first center frequency, and second Fourier transformer 270 having a second center frequency where the first center frequency is different than the second center frequency. The circuitry to detect further includes digital frequency generator 230 that generates a first digital signal at the first center frequency coupled to first Fourier transformer 260, and a second digital signal at the second center frequency coupled to second Fourier transformer 270. The circuitry to detect further includes frequency discriminator (a part of computer 280) coupled to first and second Fourier transformers 260, 270. The circuitry to detect further includes frequency converter 240 coupled between information signal 204 and inputs to first and second Fourier transformers 260, 270. Digital frequency generator 230 further generates a third digital signal coupled to frequency converter 240. The third digital signal is generated at a frequency to cause the frequency converter to shift a frequency of the information signal to a frequency between the first and second center frequencies.

Having described preferred embodiments of a novel angle rate interferometer and passive ranger (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired by Letters Patent is set forth in the appended claims.

What is claimed is:

1. A receiver comprising a processor and an RF bridge coupled to the processor to receive a reference signal from the processor, the reference signal being characterized by a constant predetermined frequency, the RF bridge including:
   first and second frequency converters coupled to respective first and second antennas; and
   a third frequency converter coupled to outputs of the first and second frequency converters.

2. The receiver of claim 1, wherein the third frequency converter provides an information signal that is coupled to the processor.

3. A receiver according to claim 1, wherein the reference signal is coupled to only one of the first and second frequency converters.

4. A receiver comprising a processor and an RF bridge coupled to the processor to receive a reference signal from the processor, the RF bridge including:
   first and second frequency converters coupled to respective first and second antennas;
   a third frequency converter coupled to outputs of the first and second frequency converters;
   a frequency source coupled to the first frequency converter; and
   a fourth frequency converter coupled to the reference signal and coupled between the frequency source and the second frequency converter.

5. The receiver of claim 4, wherein the RF bridge further includes a filter coupled between the fourth frequency converter and the second frequency converter, the filter providing a stop band at a highest frequency of a signal from the frequency source and a pass band at a shifted frequency that is a sum of a frequency of the reference signal and a lowest frequency from the frequency source.

6. A receiver comprising a processor and an RF bridge coupled to the processor to receive a reference signal from the processor, the RF bridge including:
   first and second frequency converters coupled to respective first and second antennas;
   a third frequency converter coupled to outputs of the first and second frequency converters;
   an up converter coupled between the processor and the RF bridge to frequency translate the reference signal by a predetermined frequency into an intermediate reference signal coupled to the RF bridge; and
   a down converter coupled between the RF bridge and the processor to frequency translate an information signal from the RF bridge by the predetermined frequency into a shifted information signal.

7. A receiver comprising a processor and an RF bridge coupled to the processor to receive a reference signal from the processor, the RF bridge including:
   first and second frequency converters coupled to respective first and second antennas;
   a frequency source coupled to the first frequency converter; and
   a third frequency converter coupled to the reference signal and coupled between the frequency source and the second frequency converter.

8. The receiver of claim 7, wherein the RF bridge further includes a fourth frequency converter coupled to the first and second frequency converters.

9. The receiver of claim 7, wherein the RF bridge further includes a filter coupled between the third frequency converter and the second frequency converter, the filter providing a stop band at a highest frequency of a signal from the frequency source and a pass band at a shifted frequency that is a sum of a frequency of the reference signal and a lowest frequency from the frequency source.

10. A receiver comprising an RF bridge and a processor coupled to the RF bridge to receive an information signal from the RF bridge, the processor including:
    a digital frequency source to generate a reference signal based on a signal from a clock source, the reference signal being coupled to the RF bridge; and
    circuitry to detect a frequency difference from the information signal based on the signal from the clock source.

11. The receiver of claim 10, wherein the circuitry to detect includes:
    a first Fourier transformer having a first center frequency; and
    a second Fourier transformer having a second center frequency, the first center frequency being different than the second center frequency.

12. The receiver of claim 11, wherein the circuitry to detect further includes a digital frequency generator that generates:
    a first digital signal at the first center frequency coupled to the first Fourier transformer; and a second digital signal at the second center frequency coupled to the second Fourier transformer.

13. The receiver of claim 11, wherein the circuitry to detect further includes a frequency discriminator coupled to the first and second Fourier transformers.

14. The receiver of claim 11, wherein:
the circuitry to detect further includes a frequency converter coupled between the information signal and inputs to the first and second Fourier transformers; and
the digital frequency source further generates a digital signal coupled to the frequency converter, the digital signal being generated at a frequency to cause the frequency converter to shift a frequency of the information signal to a frequency between the first and second center frequencies.

15. The receiver of claim 10, wherein the RF bridge includes:
first and second RF frequency converters coupled to respective first and second antennas; and
a third RF frequency converter coupled to outputs of the first and second RF frequency converters.

16. The receiver of claim 15, wherein:
the first and second RF frequency converters receive respective first and second signals from the respective first and second antennas; and
the third RF frequency converter heterodynes signals from the first and second RF frequency converters to provide a signal that is characterized by a frequency difference modulated onto the reference signal, the frequency difference being a difference between a frequency of the first signal and a frequency of the second signal.

17. The receiver of claim 10, wherein the circuitry to detect includes:
a first Fourier transformer characterized by a first center frequency; and
a second Fourier transformer characterized by a second center frequency, the first center frequency differing from the second center frequency by a predetermined frequency difference.

18. The receiver of claim 15, wherein the RF bridge further includes:
a bridge frequency source coupled to the first RF frequency converter; and
a fourth RF frequency converter coupled to heterodyne the reference signal with a signal from the bridge frequency source to provide a signal to the second RF frequency converter.

19. A method comprising:
capturing a frequency difference that is present at first and second antennas;
producing an information signal onto which the frequency difference has been modulated;
forming a first Fourier transform of the information signal at a first center frequency; and
forming a second Fourier transform of the information signal at a second center frequency, the second center frequency being different than the first center frequency.

20. The method of claim 19, further comprising a step of determining a range between an emitter generating the signal and a point between the first and second antennas.

21. The method of claim 19, further comprising determining a range based on outputs of the first and second Fourier transforms.

22. A method according to claim 19, wherein the first center frequency differs from the second center frequency by a predetermined frequency difference.

23. A method comprising:
capturing a frequency difference that is present at first and second antennas;
producing an information signal onto which the frequency difference has been modulated; and
analyzing the information signal to determine the frequency difference,
wherein the analyzing includes forming a first Fourier transform of the information signal at a first center frequency over an integration interval,
wherein the analyzing also includes forming a second Fourier transform of the information signal at a second center frequency over the integration interval,
wherein the second center frequency is different than the first center frequency, and
wherein the integration interval is inversely proportional to a difference between the first center frequency and the second center frequency.

24. The method of claim 23, wherein the step of analyzing determines the frequency difference to be $$\left(\frac{\pi}{2T}\right)\left(\frac{A-B}{A+B}\right),$$

where T is the integration interval, A is the first Fourier transform and B is the second Fourier transform.

25. A receiver comprising:
a processor providing a reference signal characterized by a reference frequency; and
an RF bridge that includes a frequency source, plural frequency converters and two antennas, the plural frequency converters including a first frequency converter coupled to a signal from the frequency source and to a first of the two antennas, a second frequency converter coupled to a second of the two antennas, and a third frequency converter coupled to heterodyne the signal from the frequency source with the reference signal and provide a signal to the second frequency converter, the RF bridge providing an information signal to the processor that is characterized by a frequency equal to the reference frequency modulated by a frequency difference, the frequency difference being a difference between a frequency of a signal received at one of the two antennas and a frequency of a signal received at another of the two antennas.

26. A receiver comprising a processor and an RF bridge coupled to the processor to receive a reference signal from the processor, the RF bridge including:
first and second frequency converters coupled to respective first and second antennas, the reference signal being coupled to only one of the first and second frequency converters; and
a third frequency converter coupled to outputs of the first and second frequency converters.

27. A receiver comprising an RF bridge and a processor coupled to the RF bridge to receive an information signal from the RF bridge, the processor including:
a digital frequency source to generate a reference signal using a signal from a clock source, the reference signal being coupled to the RF bridge; and
circuitry to detect a frequency difference from the information signal using the signal from the clock source.

* * * * *